United States Patent
Imura

(10) Patent No.: US 7,327,458 B2
(45) Date of Patent: Feb. 5, 2008

(54) SPECTRAL SENSITIVITY COMPOSING SYSTEM

(75) Inventor: Kenji Imura, Toyohashi (JP)

(73) Assignee: Konica Minolta Sensing, Inc., Osaka (JP)

( * ) Notice: Subject to any disclaimer, the term of this patent is extended or adjusted under 35 U.S.C. 154(b) by 70 days.

(21) Appl. No.: 11/145,267

(22) Filed: Jun. 2, 2005

(65) Prior Publication Data

US 2005/0270526 A1    Dec. 8, 2005

(30) Foreign Application Priority Data

Jun. 4, 2004    (JP) ............... 2004-166618

(51) Int. Cl.
- G01N 21/25 (2006.01)
- G01J 1/42 (2006.01)
- G01J 1/44 (2006.01)
- H03F 3/08 (2006.01)
- H03K 17/78 (2006.01)
- H03K 17/785 (2006.01)

(52) U.S. Cl. .............. 356/405; 356/406; 250/214 A; 250/214 C; 250/214 DC; 250/214 L; 250/214 SW; 250/208.2

(58) Field of Classification Search ............... 356/405, 356/406, 326; 250/208.2, 208.5, 214 R–215
See application file for complete search history.

(56) References Cited

U.S. PATENT DOCUMENTS

| 3,060,790 | A | * | 10/1962 | Ward | 356/405 |
| 3,755,680 | A | * | 8/1973 | Smith et al. | 250/226 |
| 3,804,531 | A | * | 4/1974 | Kosaka et al. | 356/405 |
| 3,814,932 | A | * | 6/1974 | Anati et al. | 358/501 |
| 4,055,813 | A | * | 10/1977 | French | 330/103 |
| 4,449,821 | A | * | 5/1984 | Lee | 356/319 |
| 5,157,465 | A | * | 10/1992 | Kronberg | 356/405 |
| 5,502,299 | A | * | 3/1996 | Standley | 250/208.2 |
| 5,604,594 | A | * | 2/1997 | Juffinger | 356/405 |

FOREIGN PATENT DOCUMENTS

| JP | 60-007330 | 1/1985 |
| JP | 05-281043 | 10/1993 |

* cited by examiner

Primary Examiner—Gregory J. Toatley, Jr.
Assistant Examiner—Bryan J Giglio
(74) Attorney, Agent, or Firm—Brinks Hofer Gilson & Lione

(57) ABSTRACT

An output current from each pixel sensor can be extracted at an arbitrary ratio by a current divider. An arithmetic control unit sets the dividing ratio in correspondence to a color matching function. The current components are added together by a summing amplifier so that a signal corresponding to a tristimulus value is composed and then converted into a digital signal. That is, weighting by weight factors corresponding to color matching functions of CIE 2-degree observer is performed in a stage of analog signal processing.

11 Claims, 11 Drawing Sheets

SPECTRAL SENSITIVITY COMPOSING SYSTEM

This application is based on the application Ser. No. 2004-166618 filed in Japan, the contents of which are hereby incorporated by reference.

BACKGROUND OF THE INVENTION

1. Field of the Invention

The present invention relates to a spectral sensitivity composing system in a colorimeter or the like.

2. Description of the Related Art

In a colorimeter for measuring the color values of incident light, the light need to be measured with the spectral sensitivity approximating a predetermined spectral sensitivity, specifically, the standard observer's color matching function recommended by CIE (International Commission on Illumination). With recent increase in the use of monochromatic light sources and light sources composed of a combination of monochromatic lights, such as liquid crystal displays, plasma displays, and LEDs, demand is increasing for the precision in the approximation.

In order to realize a predetermined spectral sensitivity, the following two methods have been used conveniently. In a first method, a plurality of optical filters are used in combination (a filter method, hereafter). In a second method, light to be measured is separated into a plurality of wavelength components by wavelength separating means, and then received respectively by plural elements of light receiving means (pixel sensors, hereafter). The output of each pixel sensor is multiplied each by the specific weight factor, and then added together (spectrophotometric method, hereafter). The difference between the filter and the spectrophotometric method is summarized in the following Table 1.

TABLE 1

| Method | Processing | Precision | S/N | Noise Factor | Circuit Scale | Dynamic Range |
|---|---|---|---|---|---|---|
| Filter | Parallel | − | + | | + | + |
| Spectrophotometric | Parallel | + | − | Low Signal Level | − | + |
| | Serial | + | −− | Low Signal Level Switching Noise | + | − |

As shown in Table 1, in the filter method where a predetermined spectral sensitivity is approximated by a combination of optical filters, the light to be measured is received by a single light receiving element via the combined filters. Accordingly, the wavelength range of received light is wide and the light receiving element of large receiving area can be used. As the result, this method has an advantage of high signal current resulting good S/N ratio. Additionally filter method has advantages of the small circuit scale and the short processing time as all wavelength components in the spectral sensitivity are received simultaneously, and an advantage of the wide dynamic range. However, restrictions in the available filters and variation in characteristics of each filter cause a difficulty in achieving a desired precision in the approximation. Thus, in recent years, the abovementioned spectrophotometeric method becomes dominant in practice.

In the above-mentioned spectrophotometeric method, the light to be measured in the visible wavelength range of 400-700 nm is separated into 31 wavelength components with 10 nm interval for example by wavelength separator as shown in FIG. 13. Then, each separated wavelength component is received by a corresponding pixel sensor. Each of data representing the wavelength component obtained by processing and A/D converting the output signal from each pixel sensor is numerically multiplied by the specific weight factor corresponding to a predetermined spectral sensitivity, and then added together for approximating the predetermined spectral sensitivity such as color matching functions $x(\lambda)$, $y(\lambda)$, $z(\lambda)$ of 2 degree (2°) observer defined by CIE. Thus, the spectrophotometric method has the advantage of a high precision in the approximation. However, as each pixel sensor receives one of 31 wavelength components of narrow wavelength range, problems due to the low signal current from each pixel sensor and the low S/N ratio is unavoidable. Either of parallel processing or serial processing is used for the signal processing in the spectrophotometric method in general. Parallel processing where signals from all pixels are processed in parallel requires as many signal processing circuits as wavelength components causing a significant increase of circuit scale. Serial processing using CCD or other charge transfer devices are used as the light receiving element where signals from the pixels are processed serially and the circuit scale is reduced. However, switching noise associated with the charge transfer degrades the S/N ratio and the narrow dynamic range due to the structure is problematic.

An object of this invention is to provide a spectral sensitivity composing system which precisely approximates a desired spectral sensitivity but is small in circuit scale and high in S/N ratio.

SUMMARY OF THE INVENTION

In order to achieve the above-mentioned object, a spectral sensitivity composing system for composing a predetermined spectral sensitivity comprises: a wavelength separator for separating light to be measured into a plurality of wavelength components; a plurality of sensors for receiving the wavelength components separated by said wavelength separator; current dividers each provided to each of said pixel sensors for dividing an output current from the corresponding sensor at an arbitrary ratio; a summing amplifier for receiving the current components outputted from said current dividers and thereby outputting a signal corresponding to the sum of the received current components; and a setting circuit for setting a dividing ratio corresponding to a predetermined spectral sensitivity in each of said current dividers.

This configuration provides a spectral sensitivity composing system which precisely approximates a desired spectral sensitivity but is small in circuit scale and high in S/N ratio.

In the following description, like parts are designated by like reference numbers throughout the several drawings.

DETAILED DESCRIPTION OF THE PREFERRED EMBODIMENT

First Embodiment

Figure 1:
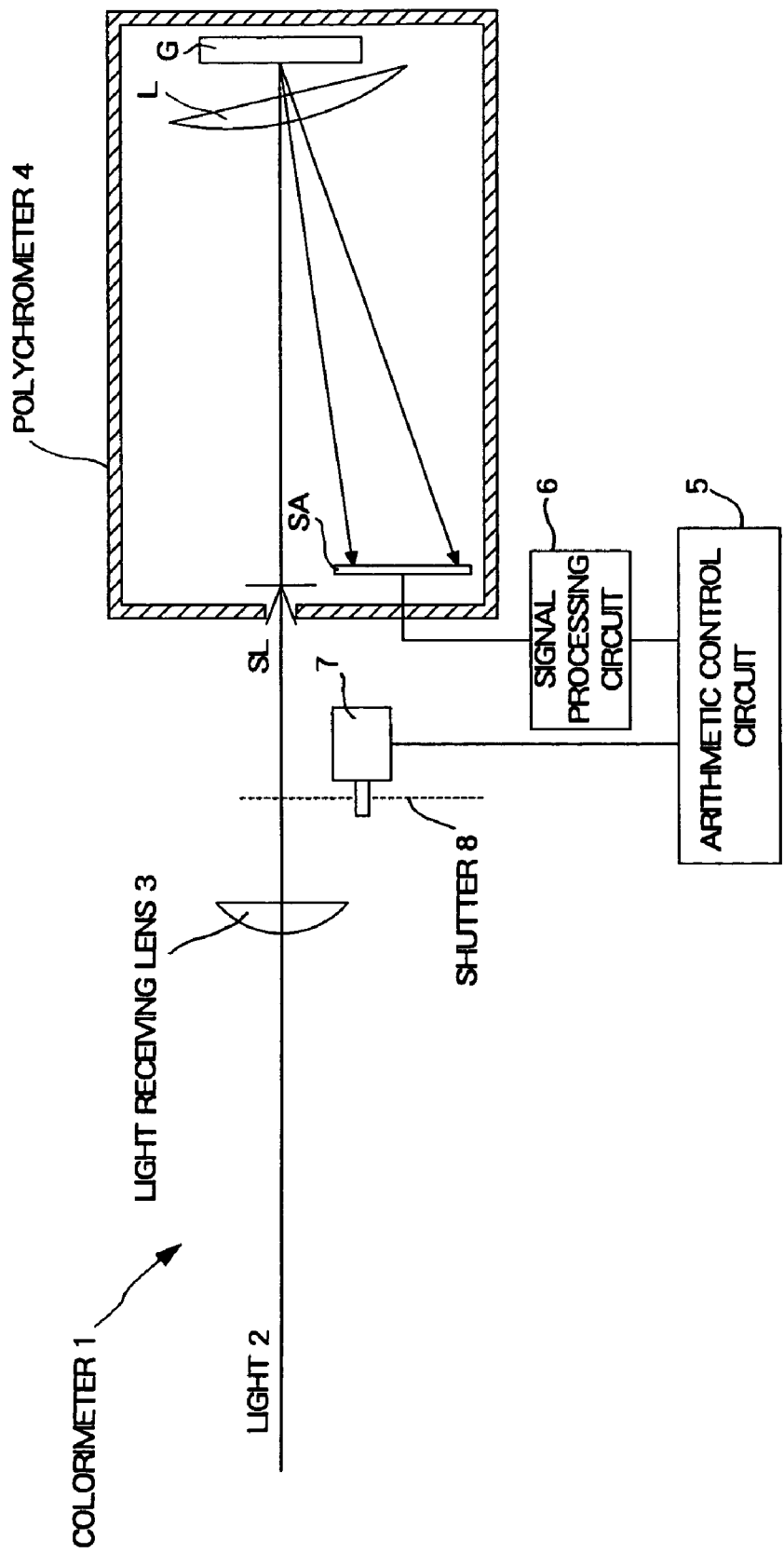
FIG. 1 is a configuration of a colorimeter according to a first embodiment.

FIG. 1 is a block diagram showing the configuration of a colorimeter 1 according to a first embodiment. Light 2 to be measured is collimated at an entrance slit SL of a polychromater 4 by a light receiving lens 3. The light 2 entered into the polychromater 4 is reflected and dispersed in different directions corresponding to wavelengths by a dispersing device G provided as a wavelength separating mean. Then, a dispersed image of the entrance slit SL is formed on a sensor array SA by an imaging lens L.

Figure 13:
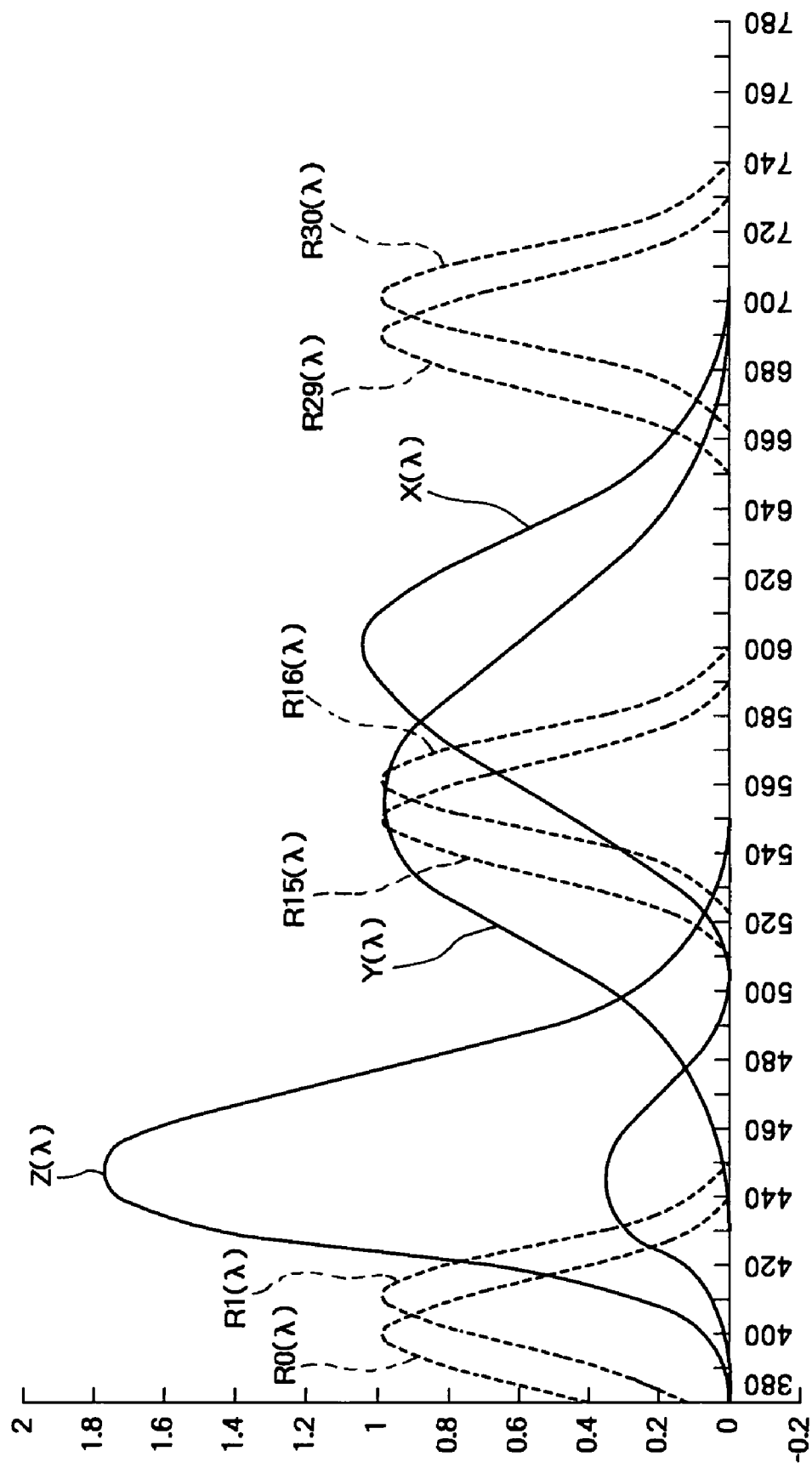
FIG. 13 is a graph showing an example of the relation between the spectral sensitivities of a plurality of pixel sensors in a polychromater and the color matching functions of CIE 2 degree observer.

The sensor array SA consists of 31 silicon photodiodes or the like arranged at regular intervals (pixel sensors, hereafter). These pixel sensors together with other components of the polychromater 4 have respective spectral sensitivities $R0(\lambda)$-$R30(\lambda)$ shown in FIG. 13. Output currents I0-I30 from pixel sensors are weighted by predefined weights and combined together (described later in detail) in a signal processing circuit 6 controlled by an arithmetic control unit 5. Eventually, digital outputs corresponding to the tristimulus values X, Y, Z based on color matching functions $x(\lambda)$, $y(\lambda)$, $z(\lambda)$ of CIE 2-degree observer are transmitted to the arithmetic control unit 5.

A shutter 8 driven by a drive unit 7 is provided behind the light receiving lens 3. The drive unit 7 is controlled by the arithmetic control unit 5 so that the incidence of the light 2 to be measured is controlled. The shutter 8 is closed when being out of measurement or during calibration, while is opened during measurement. The arithmetic control unit 5 acquires offset data from the signal processing circuit 6 when the shutter 8 is closed to block the incident light and on the basis of this data, corrects the output data for the light 2 to be measured.

Figure 2:
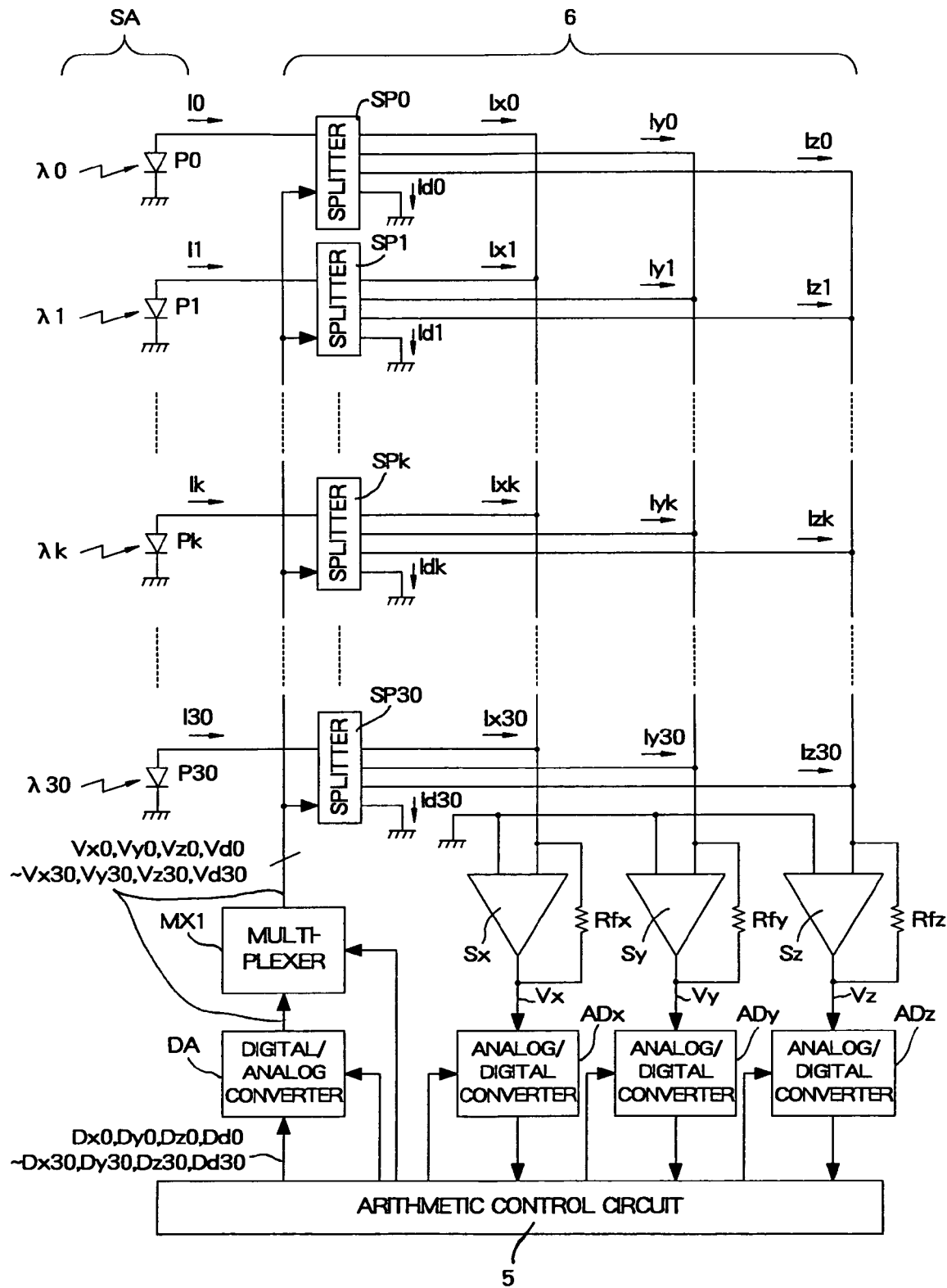
FIG. 2 is a block diagram showing a detailed configuration of a signal processing circuit according to a first embodiment.

FIG. 2 is a block diagram showing a detailed configuration of the signal processing circuit 6 of the first embodiment. Pixels P0-P30 of the sensor array SA output photocurrents I0-I30 in response to the intensities of the wavelength components ($\lambda 0$-$\lambda 30$) of the light 2 to be measured. In each of the current dividers (current splitters, hereafter) SP0-SP30 provided to each pixel sensor, each of the photocurrents I0-I30 is separated into four components which are Ix0-Ix30, Iy0-Iy30, Iz0-Iz30 corresponding to the color matching functions $x(\lambda)$, $y(\lambda)$, $z(\lambda)$ respectively, and an excess component Id0-Id30. Among those, the excess components Id0-Id30 are drained to the ground (GND). The components (Ix0-Ix30, Iy0-Iy30, Iz0-Iz30) corresponding to the color matching functions $x(\lambda)$, $y(\lambda)$, $z(\lambda)$ are inputted to summing amplifiers Sx, Sy, Sz, thereby added together, and then converted to voltage outputs Vx, Vy, Vz. At the same time, the signals are amplified by feedback resistors Rfx, Rfy, Rfz. The obtained voltage outputs Vx, Vy, Vz are converted to digital data by analog to digital converters ADx, ADy, ADz, and are then inputted to the arithmetic control unit 5.

For each of the current splitters SP0-SP30, dividing (splitting) ratio setting voltages (Vx0-Vx30, Vy0-Vy30, Vz0-Vz30, Vd0-Vd30) corresponding to the spectral sensitivity of the color matching functions $x(\lambda)$, $y(\lambda)$, $z(\lambda)$ are generated by converting dividing (splitting) ratio data (Dx0-Dx30, Dy0-Dy30, Dz0-Dz30, Dd0-Dd30) outputted from the arithmetic control unit 5 to analog voltage by a digital to analog converter DA. Then, these voltages are successively set into the current splitters SP0-SP30 via a multiplexer MX1.

Figure 3:
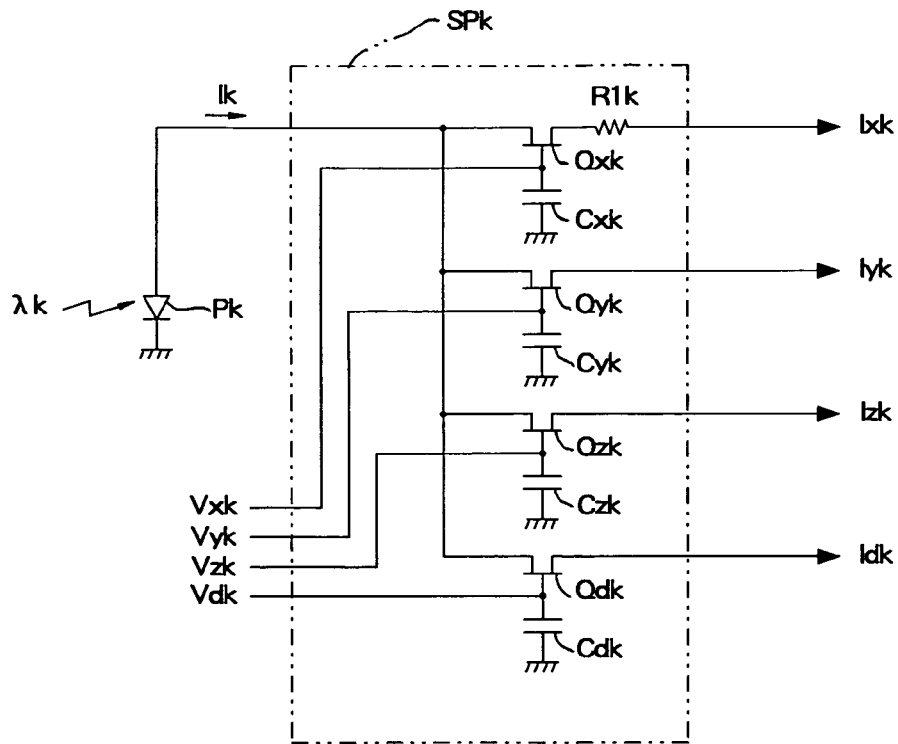
FIG. 3 is an electric circuit diagram showing an example of detailed configuration of a current divider.

FIG. 3 is an electric circuit diagram showing a detailed configuration of a current splitter SPk for an arbitrary k-th pixel (k=0-30). The current splitter SPk comprises: three FETs Qxk, Qyk, Qzk provided as first resistance elements for extracting current components Ixk, Iyk, Izk composing the spectral sensitivity of the color matching functions $x(\lambda)$, $y(\lambda)$, $z(\lambda)$ to the summing amplifiers Sx, Sy, Sz respectively; an FET Qdk provided as a second resistance element to drain an excess current remaining after extracting current components Ixk, Iyk, Izk to the summing amplifiers Sx, Sy, Sz; and capacitors Cxk, Cyk, Czk, Cdk for holding the gate voltage of the FETs Qxk, Qyk, Qzk, Qdk respectively.

The FETs Qxk, Qyk, Qzk, Qdk are connected in parallel each other. The channel resistance of each FET can be controlled by the gate voltage, while the resistance element is shut down when a shut down voltage is applied to the gate. Accordingly, channel resistances of the FETs Qxk, Qyk, Qzk, Qdk can be adjusted by adjusting gate voltages such as to realize the dividing (splitting) ratios for composing the color matching functions $x(\lambda)$, $y(\lambda)$, $z(\lambda)$. As such, the photocurrent Ik from the corresponding pixel sensor Pk is divided (split) into current components Ixk, Iyk, Izk corresponding to the color matching functions $x(\lambda)$, $y(\lambda)$, $z(\lambda)$ and excess current Idk to be drained to the GND by the current splitter SPk.

Thus, the excess current Idk remaining after Ixk, Iyk, Izk is extracted to the summing amplifiers Sx, Sy, Sz by the FETs Qxk, Qyk, Qzk depending on the spectral sensitivity to be composed, is removed by the FET Qdk. This enables to precisely approximate predetermined spectral sensitivities by means of current splitting.

Further, the use of the FETs Qxk, Qyk, Qzk and the FET Qdk as the first and the second resistance elements simplifies a configuration for setting splitting ratios and also enables to change or modify splitting ratios easily if necessary for composing different spectral sensitivities for example. Furthermore, as described later, each individual system can be recalibrated after manufacturing without a complicated work by measuring a reference light source and adjusting the gate voltages based on the result of the measurement.

Figure 4:
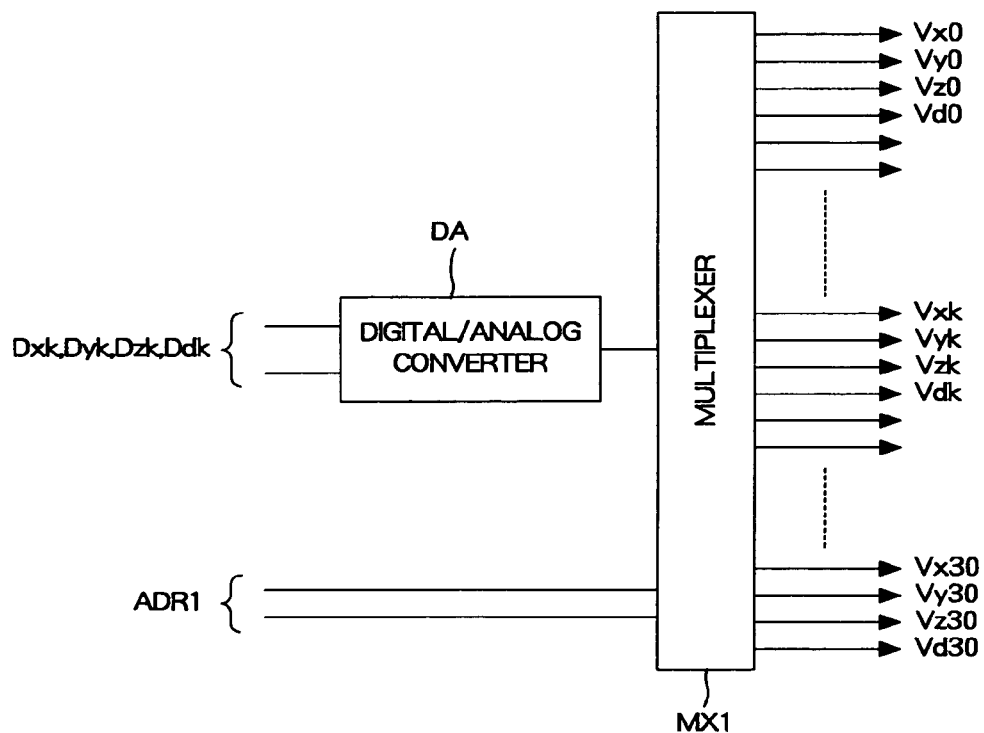
FIG. 4 is a block diagram showing an example of configuration of a digital to analog converter and a multiplexer.

FIG. 4 is a block diagram showing an example of configuration including the digital to analog converter DA and the multiplexer MX1. The digital to analog converter DA converts the splitting ratio data Dxk, Dyk, Dzk, Ddk successively outputted from the arithmetic control unit 5 to the analog voltages Vxk, Vyk, Vzk, Vdk. The voltages Vxk, Vyk, Vzk, Vdk are successively inputted to the multiplexer MX1, and then selectively set in the capacitors Cxk, Cyk, Czk, Cdk in each current splitter SPk according to address data ADR1 outputted from the arithmetic control unit 5.

Thus, by setting the discharging time constants of the capacitors Cxk, Cyk, Czk, Cdk determined by the capacitance of the capacitor and the leakage resistance, sufficiently longer than the period of voltage setting by multiplexer MX2, the gate voltages are maintained at values realizing predetermined spectral sensitivities. This configuration allows setting all gate voltages for predetermined spectral sensitivities by a single set of the arithmetic control unit 5, the digital to analog converter DA, and the multiplexer MX1.

Figure 5:
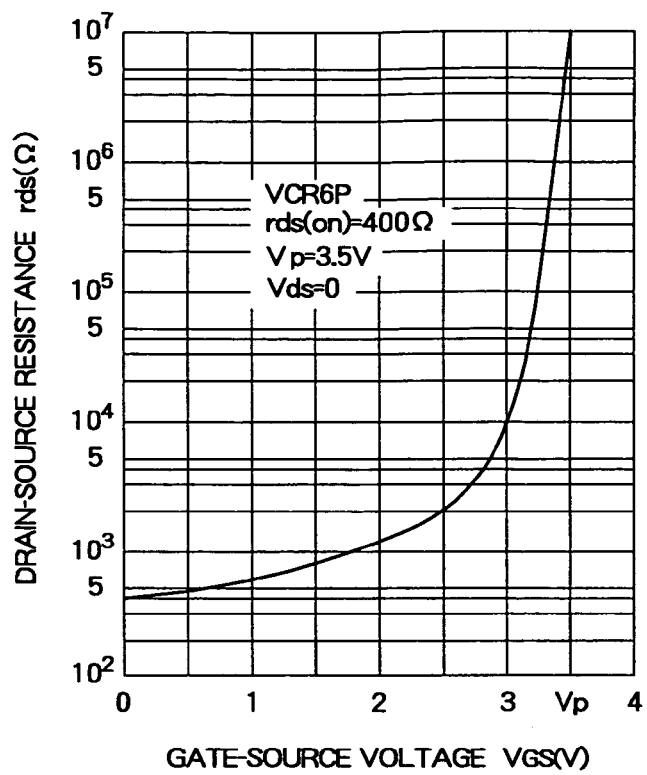
FIG. 5 is a graph showing an example of the relation between the gate-source voltage and the drain-source resistance of an FET.

FIG. 5 is a graph showing a typical relation between the gate-source voltage Vgs and the drain-source resistance "rds" of an FET in a current splitter. As seen in FIG. 5, a practical range of the resistance of FET used as a variable resistor is from a few hundred Ω to 10 kΩ or the like. Thus, when an extremely small current component is required, that is, when a resistance of 10 kΩ or greater is required, a fixed resistor R1k can be added in series as shown in the FET Qxk of FIG. 3.

Figure 6:
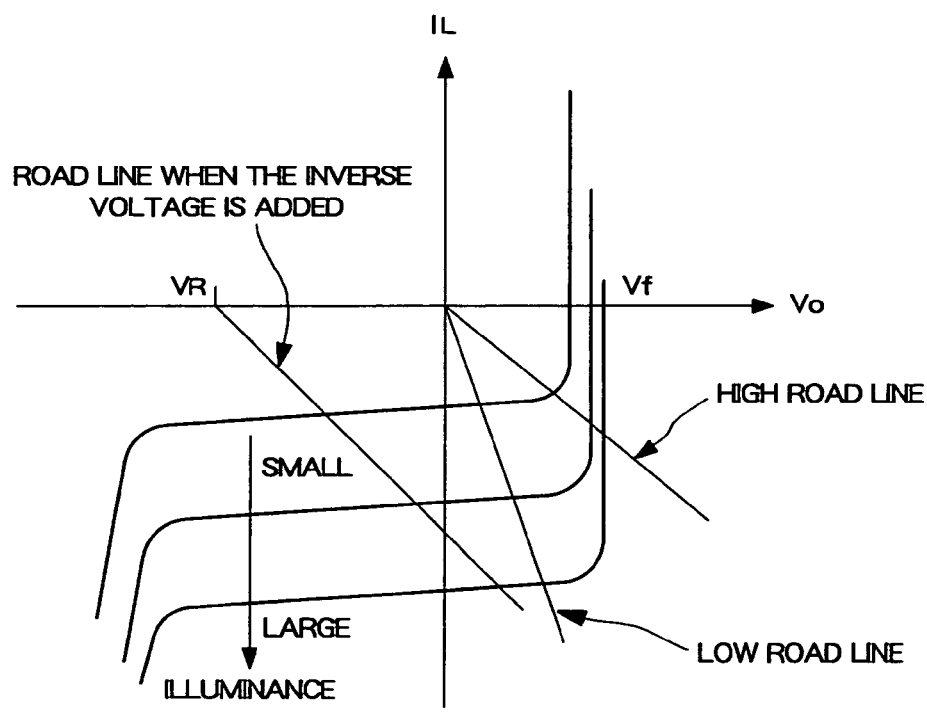
FIG. 6 is a graph showing the current-voltage characteristics of a silicon photodiode.

FIG. 6 shows the current-voltage characteristics of a silicon photodiode. The photocurrent is proportional to the illuminance in the flat region (A) where $V_D<Vf$ in FIG. 6, while the linearity degrades when the voltage approaches Vf. The $V_D$ determined by load resistance which is the channel resistance of the FET Qxk, Qyk, Qzk, Qdk and the photocurrent is, however, 0.1 mV or the like at most even in the possible worst cases such as 100 kΩ of load resistance and 1 nA of photocurrent or 1 kΩ of load resistance and 100 nA of photocurrent and sufficient linearity causing no practical problem is maintained as explained in detail below.

Output current I from the photodiode is expressed by the following equation.

$$I = I_L - I_S \cdot [\exp(e \cdot V_D / kT) - 1]$$

$I_L$: Photocurrent
$I_S$: Saturated reverse current (~nA)
e: Electric charge of an electron
k: Boltzmann constant
T: Absolute temperature
$V_D$: Bias voltage Here, $I_S$ has a large temperature dependence. However, if $V_D$ is low enough, the value within the brackets [ ] in the equation above is close to zero, and accordingly the influence of $I_S$ is negligible. If $V_D=0.1$ mV for example, the value within the brackets [ ] in the equation is 0.001 or the like as $e/kT \approx 40$ and hence the influence of $I_S$ is negligible.

Splitting ratio setting voltages Vxk, Vyk, Vzk, Vdk are set in the capacitors Cxk, Cyk, Czk, Cdk as described above. That is, the corresponding data Dxk, Dyk, Dzk, Ddk are successively outputted from the arithmetic control unit 5, converted into analog voltages by the digital to analog converter DA, and then set by the multiplexer MX1. Supposing that the time necessary for charging one of capacitor Cxk, Cyk, Czk, Cdk is 10 μsec, four capacitors of 31 pixel channels can be set with a period of approximately 1 msec. Thus, by giving time constants each determined by the capacitance and the leakage resistance of the capacitor sufficiently longer than the abovementioned 1 msec period to the capacitors Cxk, Cyk, Czk, Cdk, the gate voltages are precisely maintained at values set by the multiplexing for realizing predetermined spectral sensitivities, while the configuration for that is simply constituted with the arithmetic control unit 5, the digital to analog converter DA, and the multiplexer MX1.

The corresponding current components Ixk, Iyk, Izk from the current splitters SPk are respectively added together in the summing amplifiers Sx, Sy, Sz, and therein sum of current components are amplified and converted to voltage outputs Vx, Vy, Vz. Then, the voltage outputs Vx, Vy, Vz are converted to digital signal to be outputted to the arithmetic control unit 5 by the analog to digital converters ADx, ADy, ADz. Thus, the voltage outputs Vx, Vy, Vz from the summing amplifiers Sx, Sy, Sz have the spectral sensitivities corresponding to the spectral sensitivities of the color matching functions $x(\lambda)$, $y(\lambda)$, $z(\lambda)$ set by the arithmetic control unit 5. As such, the arithmetic control unit 5 can realize the spectral sensitivities of the voltage outputs Vx, Vy, Vz from the summing amplifiers Sx, Sy, Sz approximating the color matching functions $x(\lambda)$, $y(\lambda)$, $z(\lambda)$ of CIE 2 degree observer by outputting the splitting ratio data Dxk, Dyk, Dzk and setting the splitting ratios in accordance with the weights assigned to the pixel s via the splitting ratio setting voltages Vxk, Vyk, Vzk.

Figure 7:
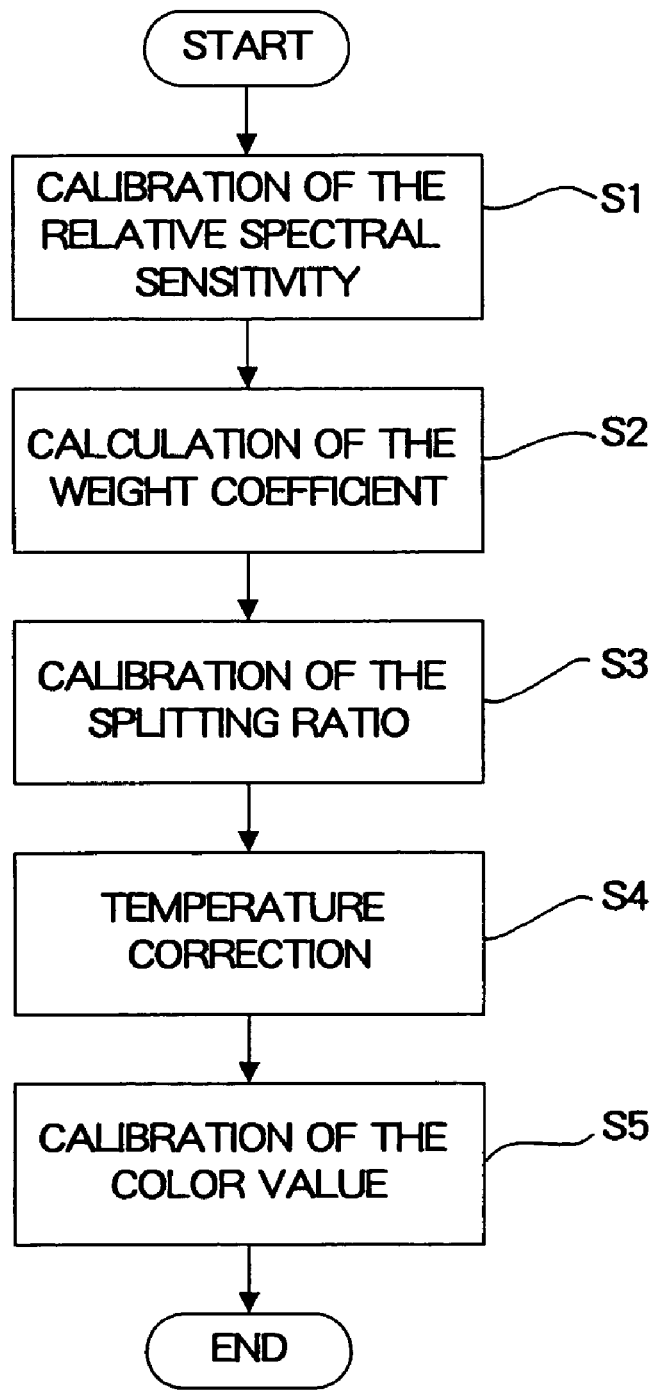
FIG. 7 is a flow chart showing a calibration procedure for a colorimeter.

FIG. 7 is a flow chart showing a calibration procedure of the colorimeter 1 having the above-mentioned configuration. The arithmetic control unit 5 performs various kinds of calibrations as follows. At step S1, a relative spectral sensitivity $Rk(\lambda)$ is acquired from the output of each pixel Pk in response to a constant energy monochromatic light input. At step S2, weights Wxk, Wyk, Wzk for each pixel are determined such that the results of weighted sum of the relative spectral sensitivities $Rk(\lambda)$ obtained at step S1 approximates the color matching functions $x(\lambda)$, $y(\lambda)$, $z(\lambda)$ of CIE 2 degree observer. At step S3, the splitting ratio data Dxk, Dyk, Dzk realizing the splitting ratios for each pixel correspond to the weights Wxk, Wyk, Wzk acquired at step S2 are determined. At step S4, temperature dependence in the channel resistance of the FETs Qxk, Qyk, Qzk, Qdk is corrected. At step S5, tristimulus values outputted with the setting by steps S1-S4 are calibrated using a reference light source having a known spectral intensity. These calibration processes are described below in detail.

First, in the calibration process for the relative spectral sensitivity $Rk(\lambda)$ at step S1, one summing amplifiers selected from Sx, Sy, Sz is used as a monitor summing amplifier. Then, monochromatic light having a half power bandwidth of 2 nm or the like and a constant energy is provided successively in 2 nm pitch from a reference monochromatic light source and received through the light receiving lens 3. Then, the output of the corresponding pixel for each monochromatic light is outputted through the monitor summing amplifier, and thereby the relative spectral sensitivity $Rk(\lambda)$ of the pixel is measured. At that time, in order to avoid current components flowing into the monitoring summing amplifier from other pixels connected in parallel, the FET for the corresponding pixel is solely turned ON, while all FETs for the other pixels are turned OFF. The scan range is 350-750 nm for example which is the measurement range of 400-700 nm plus excessive bands at both ends. In case that the half-value width (2 nm) of the monochromatic light can affect the result, the half-value width is corrected by a known method (deconvolution). In case that a resolution below 2 nm is required, interpolation is performed.

Next, in the calculation of the weight factors at step S2, each pixel Pk is conveniently assumed as a virtual pixel having a relative spectral sensitivity $Rk(\lambda)$. Then, the relative spectral sensitivity $Rk(\lambda)$ of every virtual pixel k is multiplied by weights Wxk, Wyk, Wzk, and then added together as shown in the following equations so that composed spectral sensitivities $x(\lambda)'$, $y(\lambda)'$, $z(\lambda)'$ are obtained.

$$x(\lambda)'=\Sigma_k Wxk \cdot Rk(\lambda)$$

$$y(\lambda)'=\Sigma_k Wyk \cdot Rk(\lambda)$$

$$z(\lambda)'=\Sigma_k Wzk \cdot Rk(\lambda)$$

Then, the weights Wxk, Wyk, Wzk are determined such that the composed spectral sensitivities $x(\lambda)'$, $y(\lambda)'$, $z(\lambda)'$ approximate the theoretical color matching functions $x(\lambda)$, $y(\lambda)$, $z(\lambda)$ as target. For the purpose, as shown in the following equations, the squared sums Ex, Ey, Ez of the differences between the composed and theoretical spectral sensitivities, $x(\lambda)'$, $y(\lambda)'$, $z(\lambda)'$ and $x(\lambda)$, $y(\lambda)$, $z(\lambda)$ at every wavelength are used as evaluation functions. Then, the weights Wxk, Wyk, Wzk are determined such that the evaluation functions become within the threshold.

$$Ex=\Sigma\lambda[x(\lambda)'-x(\lambda)]^2$$

$$Ey=\Sigma\lambda[y(\lambda)'-y(\lambda)]^2$$

$$Ez=\Sigma\lambda[z(\lambda)'-z(\lambda)]^2$$

Next, in the calibration of the splitting ratios at step S3, the splitting ratio in the current splitter SPk of each pixel is adjusted such that pixel-to-pixel relative ratios of the currents flowing from each pixel into the summing amplifiers Sx, Sy, Sz are in accordance with the weights Wxk, Wyk, Wzk by means of measuring a reference light source A having a known spectral intensity $A(\lambda)$. Adjustment targets for the splitting ratios are calculated as follows.

First, theoretical outputs ax0k, ay0k, az0k of each pixel k to be obtained when measuring the reference light source A are calculated according to the following equations.

$$ax0k=Wxk \cdot \int A(\lambda) \cdot Rk(\lambda) \cdot d\lambda$$

$$ay0k=Wyk \cdot \int A(\lambda) \cdot Rk(\lambda) \cdot d\lambda$$

$$az0k=Wzk \cdot \int A(\lambda) \cdot Rk(\lambda) \cdot d\lambda$$

Then, as shown in the following equations, the theoretical outputs ax0k, ay0k, az0k are multiplied by constants Cx, Cy, Cz, respectively so that bx0k, by0k, bz0k are obtained as the adjustment targets.

$$bx0k=Cx \cdot ax0k$$

$$by0k=Cy \cdot ay0k$$

$$bz0k=Cz \cdot az0k$$

Calibration between outputs from summing amplifiers Sx, Sy, Sz corresponding to the color matching functions $x(\lambda)$, $y(\lambda)$, $z(\lambda)$ is performed in color value calibration at step S5 described later. Thus, here, relative weighting between the pixels is performed for each of the color matching functions $x(\lambda)$, $y(\lambda)$, $z(\lambda)$. The constants Cx, Cy, Cz are determined conveniently such as to maximize the efficiency of the photocurrent, that is, to minimize the drain currents flowing into the ground (GND).

In short, first, the ratios between the current components flowing from one pixel channel into the three summing amplifiers Sx, Sy, Sz are adjusted in the splitting ratio adjustment within each pixel channel, and second, the ratios between the current components flowing from the pixels into one of the three summing amplifiers Sx, Sy, Sz is adjusted in the splitting ratio adjustment between pixel channels. These procedures are described below in detail.

In the splitting ratio adjustment within each pixel channel, all FETs of the pixel channels other than the concerned pixel channel k are turned OFF, and so is the FET Qdk for setting the drain current component Idk of the concerned pixel channel k. In this state, the dividing data (splitting data) Dxk, Dyk, Dzk are adjusted such that the ratio pxk:pyk:pzk of the outputs from the three summing amplifiers Sx, Sy, Sz in response to the current components Ixk, Iyk, Izk from the FETs Qxk, Qyk, Qzk of the concerned pixel channel k becomes equal to the target ratio bx0k:by0k:bz0k. When the photocurrent is divided into all the three summing amplifiers Sx, Sy, Sz, the ratio of each two is adjusted successively. For example, the splitting data Dxk, Dyk is first adjusted such that the ratio pxk:pyk becomes equal to the target ratio bx0k:by0k. Then, the splitting data Dzk is adjusted such that the ratio pyk:pzk becomes equal to the target ratio by0k:bz0k. This procedure is performed successively for each pixel channel.

In the splitting ratio adjustment between the pixel channels, the splitting ratio within the pixel channel k is set by the splitting data Dxk, Dyk, Dzk obtained in the above-mentioned splitting ratio adjustment within the pixel channel and all FETs of the pixel channels other than the pixel channel k are turned OFF. In this state, the current components Ixk, Iyk, Izk of the concerned pixel channel k can solely be monitored as the outputs pxk, pyk, pzk of the summing amplifiers Sx, Sy, Sz.

First, a suitable pixel channel r is selected as a reference pixel channel. Then, reference outputs pxr, pyr, pzk in response to its photocurrents Ixr, Iyr, Izr are measured. After that, the outputs pxk, pyk, pzk of a concerned pixel channel k are monitored. In this state, the splitting ratio data Ddk for setting the drain current component Idk of the concerned pixel channel k is adjusted such that the ratios between the outputs pxk, pyk, pzk and the reference outputs pxr, pyr, pzr become equal to the target ratios. As the splitting ratio within the pixel channel is already adjusted, it is enough if one of the ratios, pyk:pyr for example, is adjusted to the target ratio by0k:by0r. This procedure is performed successively for each pixel channel.

Here, for avoiding the error due to the low monitoring output, the monitoring summing amplifier and the reference pixel channel are selected appropriately depending on the wavelength range. For example, on the basis of FIG. 13, for the pixels (k=0-10) corresponding to a wavelength of 500 nm or shorter, the output of the summing amplifier Sz that approximates $z(\lambda)$ is monitored with reference to a pixel (k=5) corresponding to the wavelength of 450 nm. For the pixels (k=10-30) corresponding to a wavelength of 500 nm or longer, the output of the summing amplifier Sy that approximates $y(\lambda)$ is monitored with reference to a pixel (k=15) corresponding to the wavelength of 550 nm.

As such, the splitting ratio for Ixk, Iyk, Izk is first adjusted within each pixel channel. Then, the amount of the drain current component Idk is adjusted such that the relative ratio between the pixels (wavelengths) is equal to the predetermined value.

Next, in the temperature correction at step S4, changes of the splitting ratios due to the temperature dependence of the channel resistance of FET are corrected. As the channel resistance of FET does not depend on the current level, the splitting ratios can be re-adjusted with the help of constant current provided to each current splitter by means of current injection or LED illumination.

Figure 8:
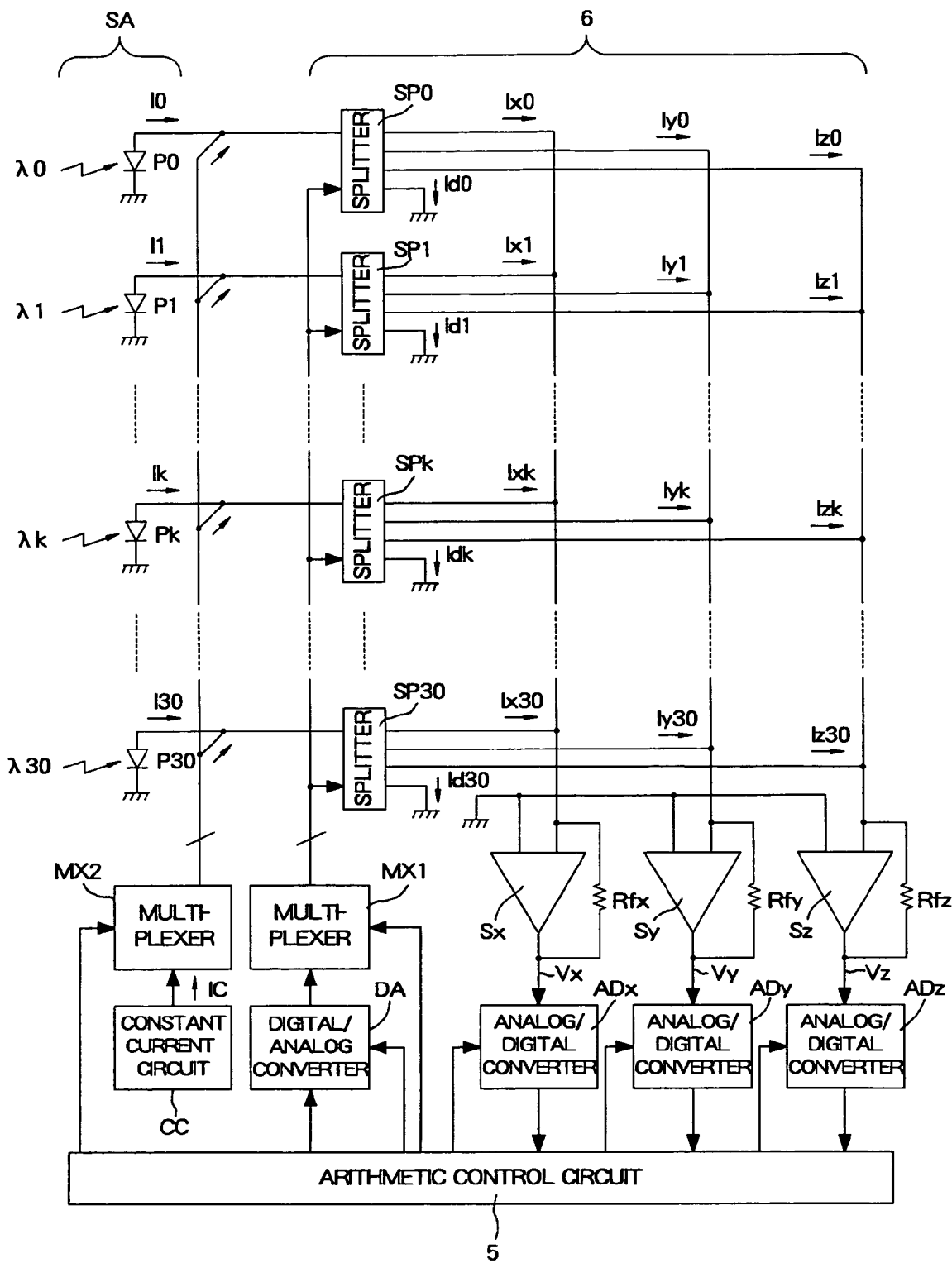
FIG. 8 is a block diagram showing an example of configuration of a signal processing circuit with temperature correction.
Figure 9:
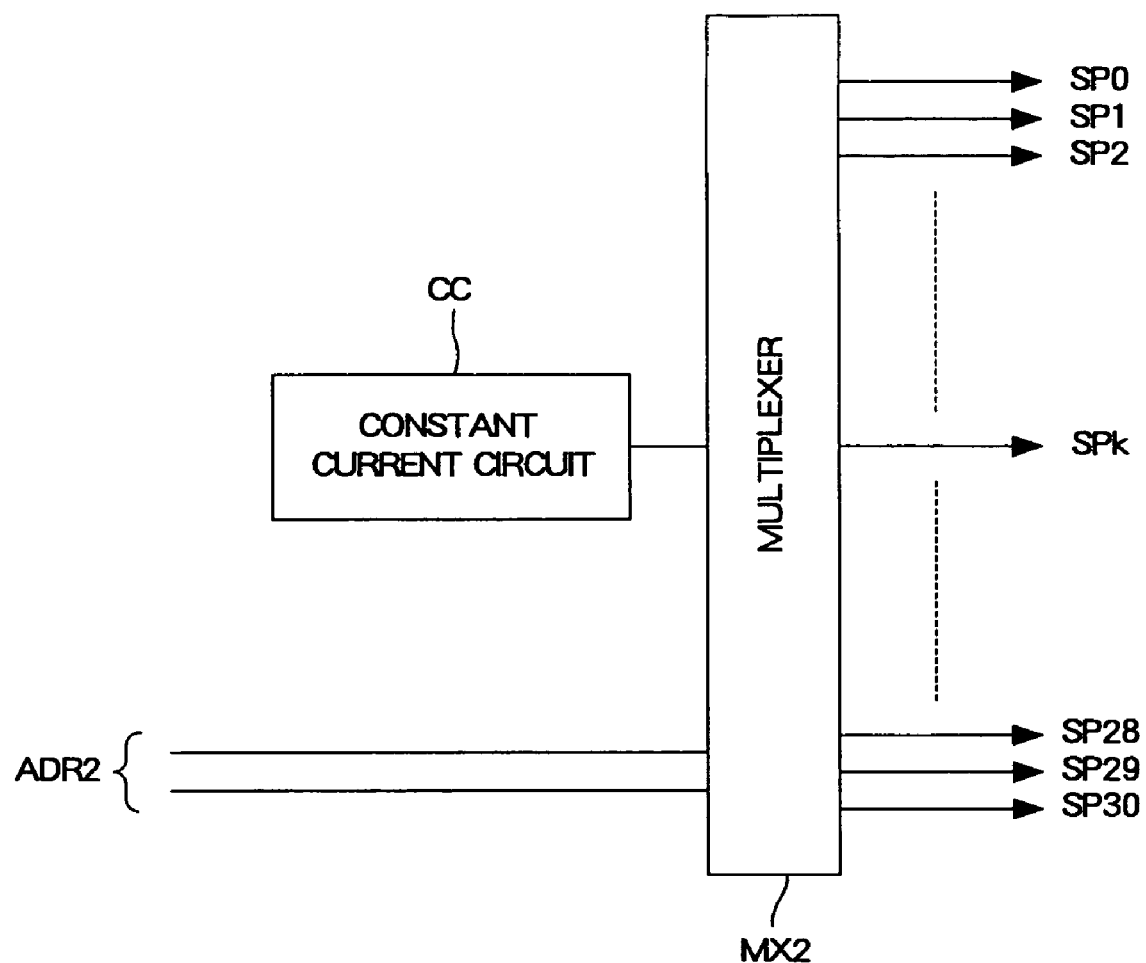
FIG. 9 is a block diagram showing a detailed configuration for the temperature correction of FIG. 8.

Specifically, in the configuration for the first technique in which a constant current is injected as shown in FIGS. 8 and 9, a constant current circuit CC generates a constant current IC and a multiplexer MX2 provides the constant current IC successively to each pixel channel k according to an address data ADR2 outputted from the arithmetic control unit 5.

Under the same temperature condition as the calibration of the splitting ratios at step S3, the splitting data Dxk, Dyk, Dzk, Ddk acquired are set up and the shutter 8 is closed to eliminate the photocurrent Ik. Then, the multiplexer MX2 is controlled so as to inject the constant current IC to a concerned pixel channel k. Then, the outputs mx0k, my0k, mz0k of the summing amplifiers Sx, Sy, Sz are measured and stored as reference values. This procedure is performed successively for each pixel channel.

In actual measurements often at the different temperature condition from that at calibration, a constant current IC is injected and the outputs mxk, myk, mzk of the summing amplifiers Sx, Sy, Sz are measured by the same procedure as that when obtaining reference values mx0k, my0k, mz0k. Then, the splitting ratio data Dxk, Dyk, Dzk, Ddk for setting the gate voltages of the FETs are re-adjusted such that the measured outputs mxk, myk, mzk become equal to the reference values mx0k, my0k, mz0k.

Figure 10:
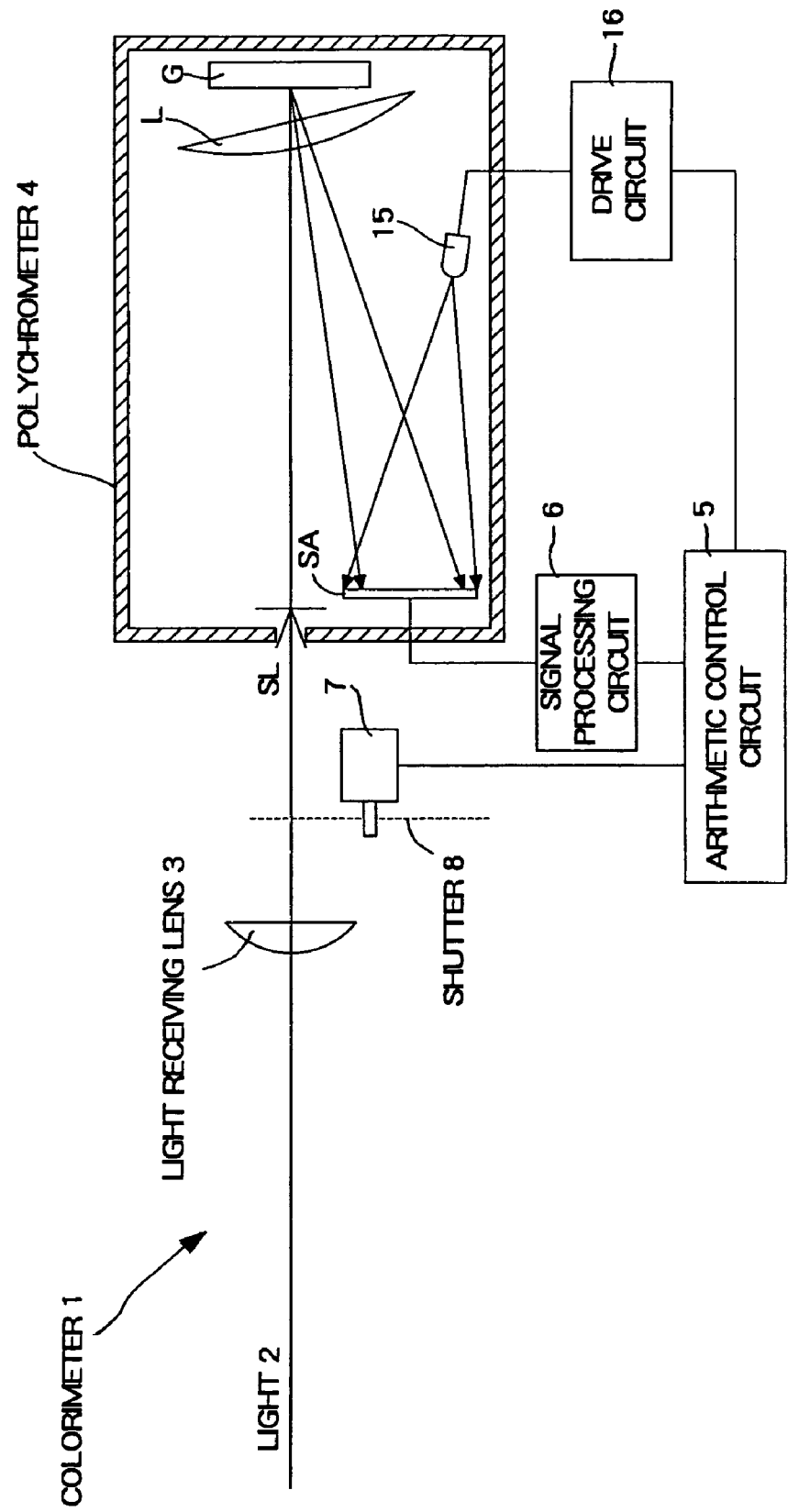
FIG. 10 is a configuration of a colorimeter with another technique of temperature correction.
Figure 11:
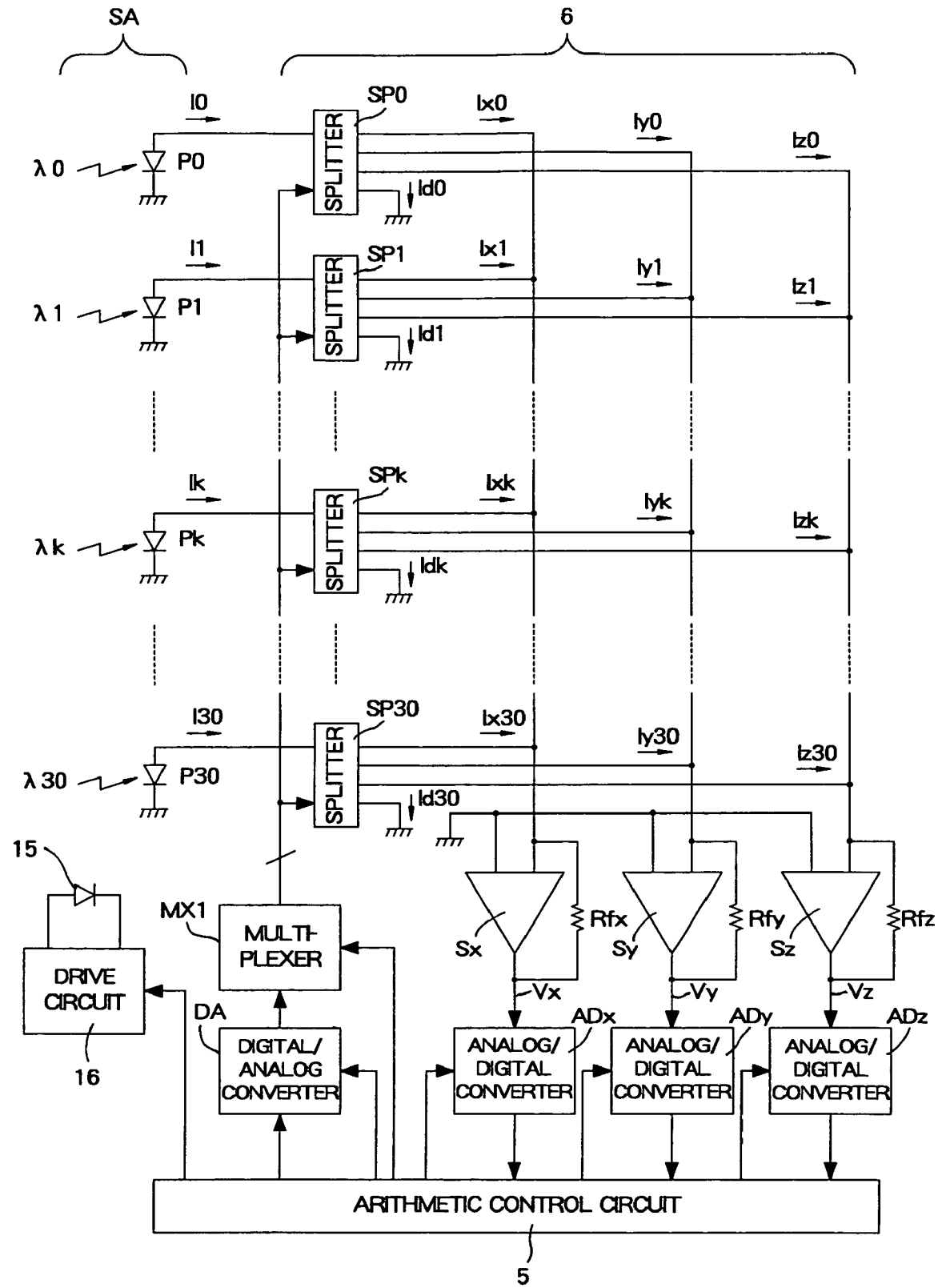
FIG. 11 is a block diagram showing an example of configuration of a signal processing circuit with another technique of temperature correction.

On the other hand, in the second technique, a constant current is injected into the current splitter by means of illumination by an LED 15 provided in the polychromater 4 as shown in FIGS. 10 and 11. This LED 15 is controlled by the arithmetic control unit 5 via the drive circuit 16 and illuminates all the pixel sensors of the sensor array SA uniformly and directly without influences of the dispersing device G. After the calibration of the splitting ratios, the shutter 8 is closed and the LED 15 is turned on to illuminate the sensor array SA under the same temperature condition as that at step 3. The splitting ratios of the concerned pixel channel k are set up by the splitting ratio data Dxk, Dyk, Dzk, Ddk obtained in the calibration of the splitting ratios while all FETs of the other pixel channels are turned OFF. Then, the outputs mx0k, my0k, mz0k of the summing amplifiers Sx, Sy, Sz are measured and stored as reference values. This procedure is performed successively for each pixel channel. The LED 15An is preferably an infrared LED as the sensor has high sensitivity in infrared region and the infrared light can pass a filter if provided in front of the sensor array SA for eliminating second order diffraction.

As the emission intensity of the LED 15 however depends on the temperature, the emission intensity of the LED 15 is simultaneously measured by an LED monitor which comprises a monitor sensor and a signal processing circuit. The measured intensity is stored as the reference value M0. It should be noted that no device having the large temperature dependence is used in the LED monitor.

In actual measurements, the LED 15 emits light before or after the measurement and the outputs mxk, myk, mzk of the summing amplifiers Sx, Sy, Sz and the emission intensity M of the LED 15 are measured for each pixel channel in the same procedure as the calibration. Then, the data Dxk, Dyk, Dzk, Ddk for the gate voltages of the FETs is re-adjusted such that the outputs mxk, myk, mzk of the summing amplifiers Sx, Sy, Sz become respectively equal to the reference values M/M0·mx0k, M/M0·my0k, M/M0·mz0k corrected by the emission intensity ratio of the LED 15 M/M0.

Alternatively, a temperature sensor may be arranged near the current splitter SPk so that the arithmetic control unit may perform the abovementioned temperature correction when a temperature change exceeding a predetermined value is detected by the temperature sensor.

In the adjustment of the color values at step S5, tristimulus values Xa, Ya, Za of the reference light source A having a known spectral intensity $A(\lambda)$ are measured with the colorimeter 1 to be adjusted having the spectral sensitivities set by the splitting ratio data Dxk, Dyk, Dzk, Ddk and corrected for temperature as described above. Then, coefficients Ex, Ey, Ez are determined according to the following equations such that the tristimulus values Xa, Ya, Za are in agreement with the theoretical tristimulus values Xa0, Ya0, Za0 calculated from the known spectral intensity $A(\lambda)$ of the reference light source A.

$Xa0 = Ex \cdot Xa$ $Ya0 = Ey \cdot Ya$ $Za0 = Ez \cdot Za$

Then, in actual measurements, the arithmetic control unit 5 outputs corrected tristimulus values X', Y', Z' calculated from measured tristimulus values X, Y, Z using following equations.

$X' = Ex \cdot X$ $Y' = Ey \cdot Y$ $Z' = Ez \cdot Z$

As described above, in the colorimeter 1 according to this embodiment, predetermined spectral sensitivities such as color matching functions of CIE 2 degree observer is realized by means of combining the wavelength components for high precision in the approximation and not by means of combination of filters (aforementioned filter method) which has the high S/N ratio and the small circuit scale but poor precision in the approximation. That is, in the colorimeter 1 according to this embodiment, the predetermined spectral sensitivities are realized by a method in which the light 2 to be measured is separated into a plurality of wavelength components by a dispersing device G and the wavelength components are received respectively by pixel sensors of a sensor array SA, and then a signal processing is performed to the photocurrent outputted from the pixel sensors. A current splitter is provided to each pixel channel k for the processing. The current splitter SPk enables a photocurrent Ik from the corresponding pixel Pk to be divided at an arbitrary ratio, while an arithmetic control unit 5 sets the splitting ratio corresponding to the desired spectral sensitivities. That is, signal processing where the photocurrent Ik from each pixel sensor Pk is divided and extracted at a given ratio performs the weighting by the specific weight factors. After that, in the colorimeter 1, the summing amplifiers Sx, Sy, Sz add together the current components Ix, Iy, Iz from the current splitters respectively so that the voltage outputs Vx, Vy, Vz have composed spectral sensitivities approximating precisely the desired spectral sensitivities.

Thus, in comparison with a prior art (aforementioned spectrophotometric method) in which the photocurrent from each pixel is individually converted to digital data, numerically multiplied by the specific weight factor corresponding to the desired spectral sensitivities, and then numerically added together for composing the spectral sensitivities, the method according to this embodiment has as high precision in the approximation as a spectrophotometric method and improved S/N ratio due to the increase of input currents to the summing amplifiers Sx, Sy, Sz performing current to voltage conversion. Furthermore, the increase of the input currents to the summing amplifiers Sx, Sy, Sz reduces the influence of noise and leakage caused by the feedback resistors Rfx, Rfy, Rfz. Further, a reduced number of the current to voltage converting circuits reduces the scale and the cost of the circuit compared to the spectrophotometric method employing a parallel processing for the advantages in the signal to noise ratio and the dynamic range.

Second Embodiment

Figure 12:
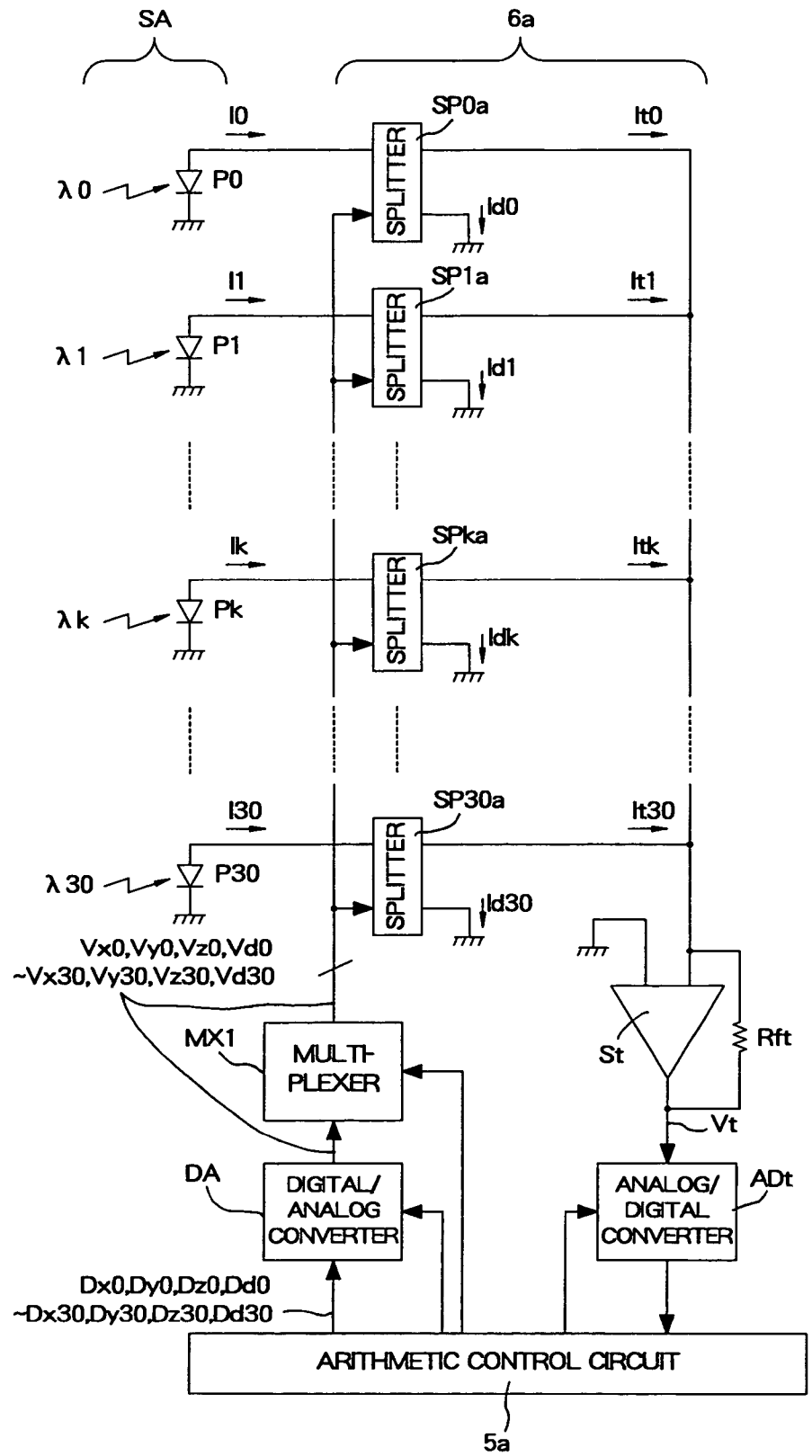
FIG. 12 is a block diagram showing a detailed configuration of a signal processing circuit according to a second embodiment.

FIG. 12 is a block diagram showing a detailed configuration of a signal processing circuit 6a according to a second embodiment. This signal processing circuit 6a is similar to the signal processing circuit 6 of the first embodiment. Thus, corresponding components are designated by the same reference numerals, and hence description is omitted. In the signal processing circuit 6, the components Ixk, Iyk, Izk for the tristimulus values X, Y, Z are processed simultaneously in parallel. However, in the signal processing circuit 6a, the components Ixk, Iyk, Izk of the tristimulus values X, Y, Z are processed serially in time sharing.

In the present embodiment, the current splitter SPka divides the inputted photocurrent Ik into two current components, Itk to be inputted to a single summing amplifier St and Idk to be drained to the ground (GND). The splitting ratio for each current splitter SPka is set by the arithmetic control unit 5a by outputting successively the splitting ratio data sets (Dxk, Ddk), (Dyk, Ddk), (Dzk, Ddk) of the corresponding color matching functions X(λ), y(λ), z(λ). The current component Itk outputted from each current splitter SPka is added together in the summing amplifier St. Then, the sum of current components is amplified and converted to voltage output by the feedback resistor Rft. The obtained voltage output Vt is converted to digital data by the analog to digital converter ADt, which is then inputted to the arithmetic control unit 5a. As such, spectral sensitivities precisely approximating the color matching functions x(λ), y(λ), z(λ) are composed sequentially. This configuration simplifies the system.

Although color matching functions of CIE 2 degree observer have been used as desired spectral sensitivities in the description given above, other spectral sensitivities such as color matching functions of CIE 10 degree (10°) observer may be used.

Alternatively, the arithmetic control unit can store splitting ratio data for both color matching functions of CIE 2 degree and 10 degree observers and either color matching functions of the two observers can be selectively set by outputting the corresponding splitting ratio data.

In the present embodiment, wavelength components are acquired by a polychromater provided with a dispersing device. However, the invention is not limited to this and the wavelength components may be acquired by a combination of a wedge type interference filter and a sensor array.

In the temperature correction at measurements, a constant current IC may be injected only into a part of the current splitters. Alternatively, the arithmetic control unit 5 or 5a may retain data for temperature correction obtained at manufacturing, and at measurements, modifies splitting ratio data based on the retained data and a temperature measured by a temperature sensor provided.

Although the present invention has been fully described by way of examples with reference to the accompanying drawings, it is to be noted that various change and modifications will be apparent to those skilled in the art. Therefore, unless otherwise such changes and modifications depart from the scope of the present invention, they should be construed as being including therein.

What is claimed is:

1. A spectral sensitivity composing system for composing a predetermined spectral sensitivity comprising:
   a wavelength separator configured to separate light to be measured into a plurality of wavelength components;
   a plurality of sensors configured to receive the wavelength components separated by said wavelength separator;
   current dividers each provided to each of said plurality of sensors, where each current divider is configured to divide an output current from a corresponding sensor into current components at an arbitrary ratio, the arbitrary ratio being set by an applied voltage;
   a summing amplifier configured to receive one of the current components to be output by each of said current dividers and to output a signal corresponding to a sum of the received current component; and
   a setting circuit configured to set a dividing ratio in each of said current dividers corresponding to a predetermined spectral sensitivity.

2. The spectral sensitivity composing system according to claim 1, wherein the summing amplifier further comprises a plurality of summing amplifiers equal in number as to a number of spectral sensitivities to be composed.

3. The spectral sensitivity composing system according to claim 2, wherein the number of current dividers is equal to the number of said plurality of sensors.

4. The spectral sensitivity composing system according to claim 3, wherein each of said current dividers comprises:
   a first resistance element configured to output a current component to a corresponding summing amplifier; and
   a second resistance element configured to drain an excess current that is excessive and is not provided to any summing amplifier.

5. The spectral sensitivity composing system according to claim 4, wherein each of said first and second resistance elements comprises a channel resistance of an FET which is controlled by a gate voltage.

6. The spectral sensitivity composing system according to claim 5, wherein each FET of the first and second resistance elements is connected to a corresponding capacitor configured to hold the gate voltage.

7. The spectral sensitivity composing system according to claim 6, wherein said setting circuit further comprises:
   a memory configured to store dividing ratio data for setting a dividing ratio in each of said current dividers in correspondence to said spectral sensitivity;
   a digital to analog converter configured to convert said dividing ratio data into voltage signals; and
   a first multiplexer configured to successively set each voltage signal outputted from said digital to analog converter into each capacitor connected to each gate of each of said FETs in each of said current dividers.

8. The spectral sensitivity composing system according to claim 7, further comprising:
   a constant current source;
   a second multiplexer configured to successively provide constant current from said constant current source to each of said current dividers; and
   correction means for controlling said second multiplexer and correcting the gate voltage of each of said FETs such that an output corresponding to said FET in said current divider provided with said constant current is equal to a reference value obtained in advance.

9. The spectral sensitivity composing system according to claim 7, further comprising:

a light blocking member configured to block light to be measured;

a light emitting element configured to illuminate each of said plurality of sensors; and a corrector configured to correct the gate voltage of each of said FETs such that an output corresponding to each of said FETs is equal to a reference value obtained when the calibration light emitting element emits light and the light to be measured is blocked.

10. A spectral sensitivity composing method for composing a predetermined spectral sensitivity, comprising;

separating light to be measured into a plurality of wavelength components by a wavelength separator;

receiving the separated wavelength components by a plurality of sensors;

dividing an output current from each of the plurality of sensors into current components at an arbitrary ratio by a plurality of current dividers;

receiving current components from said current dividers;

outputting a signal corresponding to a sum of the received current components; and applying a voltage to each of said current dividers to set dividing ratios corresponding to a predetermined spectral sensitivity.

11. A spectral sensitivity composing system for composing a predetermined spectral sensitivity comprising:

a wavelength separator configured to separate light to be measured into a plurality of wavelength components;

a plurality of sensors configured to receive the wavelength components separated by said wavelength separator;

current dividers each provided to each of said plurality of sensors, wherein:

each current divider is configured to divide an output current from a corresponding sensor into current components at an arbitrary ratio, the arbitrary ratio being set by an applied voltage;

the number of current dividers is equal to the number of said plurality of sensors; and, each of said current dividers comprises:

a first resistance element configured to output a current component to a corresponding summing amplifier; and, a second resistance element configured to drain an excess current that is excessive and is not provided to any summing amplifier, wherein:

each of said first and second resistance elements comprises a channel resistance of an FET which is controlled by a gate voltage;

a summing amplifier configured to receive one of the current components to be output by each of said current dividers and to output a signal corresponding to a sum of the received current component, the summing amplifier comprising a plurality of summing amplifiers equal in number as to a number of spectral sensitivities to be composed; and, a setting circuit configured to set a dividing ratio in each of said current dividers corresponding to a predetermined spectral sensitivity.

* * * * *